United States Patent Office 2,789,018
Patented Apr. 16, 1957

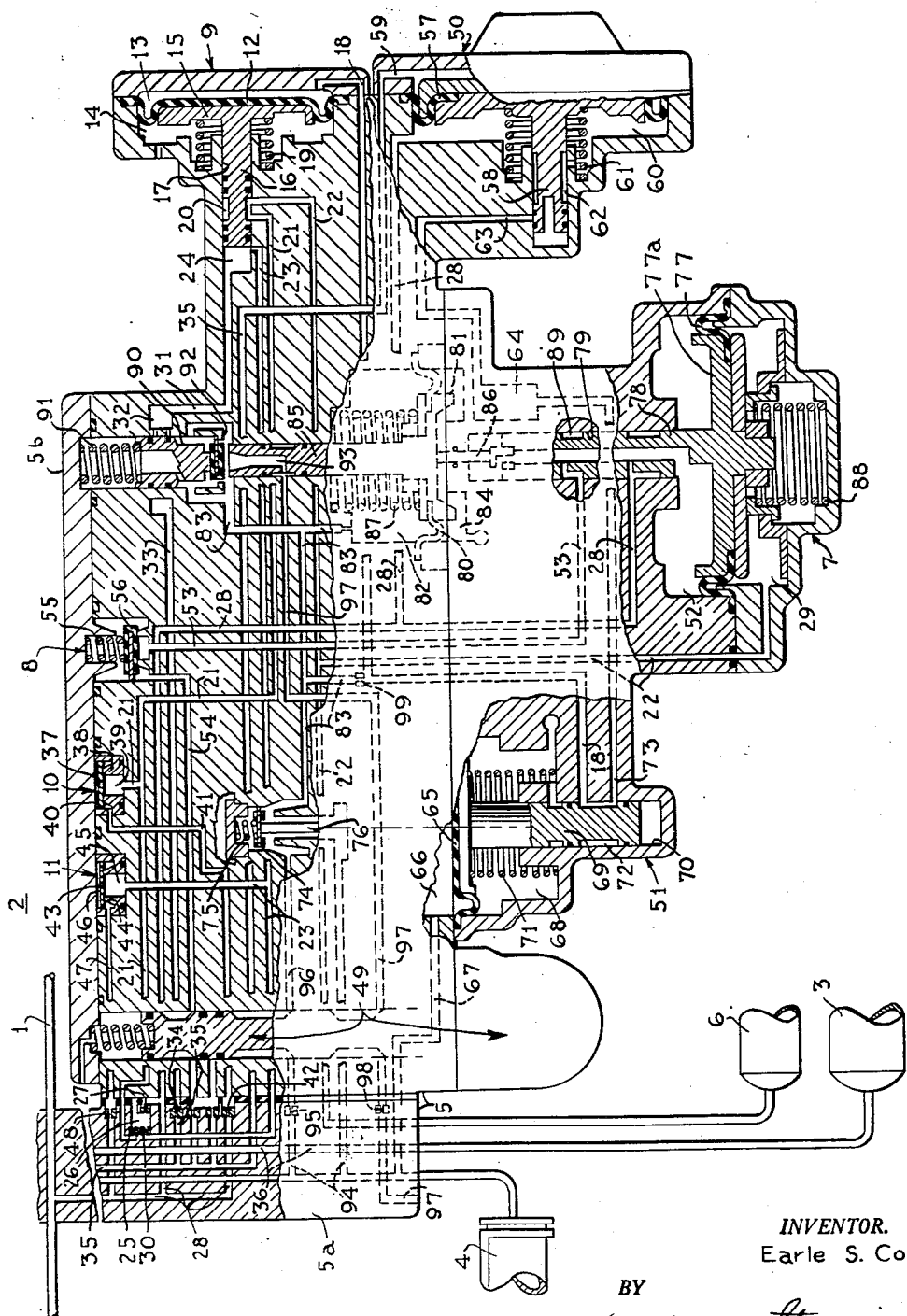
April 16, 1957 — E. S. COOK — 2,789,018
FLUID PRESSURE BRAKE APPARATUS
Filed Nov. 17, 1953
INVENTOR.
Earle S. Cook
BY
Adelbert A. Steinmiller
ATTORNEY

2,789,018

FLUID PRESSURE BRAKE APPARATUS

Earle S. Cook, Pittsburgh, Pa., assignor to Westinghouse Air Brake Company, Wilmerding, Pa., a corporation of Pennsylvania Application November 17, 1953, Serial No. 392,649

4 Claims. (Cl. 303—60)

This invention relates to fluid pressure brake apparatus and more particularly to the graduated control type adapted for use on trains in European service, in which the degree of brake application and brake release is controlled according to the extent of reduction and restoration in pressure of fluid in a brake pipe relative to that in a control reservoir.

In the copending application of Glenn T. McClure, Serial No. 388,189, filed October 26, 1953, there is shown and described an apparatus of the above type comprising, on each brake-equipped car, a charging valve device operative upon initiation of a brake application on such car to cut off fluid pressure communication between the brake pipe, the control reservoir and an auxiliary reservoir, and operative when such application has been released, to locally connect a single brake pipe passage to both the control and auxiliary reservoirs so that control reservoir pressure may equalize with brake pipe pressure and the auxiliary reservoir may be recharged to brake pipe pressure, respectively, within the usual prescribed period of time.

As will be noted from a study of the aforementioned application, at the time the charging valve device moves to charging position after final release of a brake application on the car, auxiliary reservoir pressure will, by virtue of the operation of a charging check valve device, be about one and seven-tenths p. s. i. less than the pressure of fluid in a certain chamber in a service valve device by way of which said reservoir is initially recharged from the brake pipe, although fluid pressure in said chamber may not be as high as brake pipe pressure, for reasons to be explained subsequently; and control reservoir pressure will at such time be about three p. s. i. higher than the pressure of fluid in said certain chamber; in other words, control reservoir pressure will be about four and seven-tenths p. s. i. more than auxiliary reservoir pressure. Thus, when the charging valve device moves to charging position, fluid under pressure will flow initially from the control reservoir to the auxiliary reservoir; and since the volume of the auxiliary reservoir is much greater than that of the control reservoir, an undesirable, rapid depletion of control reservoir pressure will temporarily occur which latter pressure will not be fully restored until both the auxiliary and control reservoirs have been recharged by way of the brake pipe to normal operating brake pipe pressure. If a reapplication of the brakes is initiated before control reservoir pressure has been fully restored, the charging valve device, by moving to cut-off position, will bottle up fluid in the control reservoir at a pressure less than proper datum value, with the result that attainable brake cylinder pressure will be reduced by about two and one-half p. s. i. for every p. s. i. the control reservoir pressure is below such proper value.

It will therefore be observed that if the brakes are reapplied at such frequent intervals that control reservoir pressure successively depletes into auxiliary reservoir and cannot be fully restored during full release of brakes between reapplications, such as may occur when the train is descending a long grade, there is a possibility that the attainable brake cylinder pressure may become so reduced as to render train operation hazardous.

It is therefore the principal object of this invention to provide an improved apparatus of the above type for substantially eliminating the difficulty just described.

According to this object, novel means are provided whereby the control and auxiliary reservoirs are opened, after final release of the brake application, to separate brake pipe passages which are isolated from each other by choke means so that control reservoir pressure will equalize at a controlled rate into the brake pipe, rather than into the auxiliary reservoir as heretofore; and since the volume of the brake pipe on the car is less than that of the control reservoir and is very small compared to that of the auxiliary reservoir, and since brake pipe pressure will not only be higher than auxiliary reservoir pressure at the time of such opening but will be within several p. s. i. of control reservoir pressure, the latter pressure will not be reduced substantially despite very frequent reapplications of the brakes.

Other objects and advantages will become apparent from the following, more detailed description of the invention and from the accompanying drawing, wherein the single figure is a diagrammatic view of that portion of a brake apparatus embodying the invention.

*Description*

Since the novel structure is adapted for use with fluid pressure brake apparatus which may, for sake of illustration, be of the type shown and described in the aforementioned copending application, the disclosure in the accompanying drawing and in the following description has been limited to only such structure as is essential to a clear understanding of the invention; and the reader is referreed to said application for a more detailed explanation of components not fully described herein.

Referring to the drawing, the brake apparatus comprises the usual brake pipe 1 which is adapted to extend through the train and to be charged with fluid at a pressure controlled in the well-known manner by manual operation of the usual engineer's automatic brake valve device (not shown) on the locomotive, for thereby controlling application and release of the brakes on the connected cars of the train.

On each brake-equipped car of the train there is provided a brake controlling valve device 2 adapted to respond to a reduction in pressure of fluid in the brake pipe 1 relative to the pressure in a control reservoir 6 for supplying fluid under pressure from the usual auxiliary reservoir 3 to the usual brake cylinder device 4 for effecting a corresponding degree of brake application on such car; said valve device being adapted to respond to an increase in brake pipe pressure relative to control reservoir pressure to effect a corresponding release of fluid under pressure from said brake cylinder device to atmosphere, as well as perform other functions only some of which are directly pertinent to the invention and will hereinafter be described.

The brake controlling valve device 2 comprises a combination pipe bracket and casing, designated generally by the reference numeral 5, and consisting of a pipe bracket 5a and a casing 5b; to this bracket the brake pipe 1, auxiliary reservoir 3, brake cylinder device 4 and the control reservoir 6 are adapted to be connected. The brake controlling valve device 2 also comprises the usual graduated control portion or service valve device 7 and the usual charging check valve device 8, both of which devices may be identical in structure and operation with those shown and described in the aforementioned application.

According to the invention, the brake controlling valve device 2 also comprises a charging valve device 9, a control reservoir overcharge check valve device 10 and an auxiliary reservoir overcharge check valve device 11; said devices 9, 10, 11 being formed within, and in part defined by, the various sections of casing 5b.

The charging valve device 9 comprises a flexible diaphragm 12, which is suitably clamped at its outer periphery between adjacent casing sections and separates a pressure chamber 13 from a non-pressure chamber 14 which is constantly open to atmosphere. The diaphragm 12 is operatively connected to a diaphragm follower 15 having an integrally formed combination follower stem and valve 16 which extends through the non-pressure chamber 14 and has slidable, sealing engagement with the wall of a coaxially aligned bore 17 in casing 5b. The chamber 13 is adapted to be charged with fluid under pressure or vented to atmosphere in the usual manner by way of a passage 18 in the casing. When chamber 13 is devoid of fluid under pressure, a spring 19 is disposed in chamber 14 and acting on the diaphragm follower 15 is adapted to urge the diaphragm 12 and valve 16 into one position, hereinafter referred to as the charging position of the charging valve device 9. When, on the other hand, fluid under pressure is supplied to chamber 13, the diaphragm 12 is adapted to deflect against resistance of spring 19 and thereby advance the valve 15 to another position, hereinafter referred to as the cut-off position of charging valve device 9.

According to a feature of the invention, when the charging valve device 9 is in charging position, in which it is shown in the drawing, an elongated annular cavity 20 formed in the outer periphery of the stem 16 is adapted to establish a fluid pressure communication between a passage 21 and a passage 22; and at the same time, the projecting end of said stem is adapted to uncover a passage 23 to a chamber 24 defined by the projecting end of said stem and the base and wall of bore 17.

The passage 21 is constantly open to the brake pipe 1 by way of a choke 25, a chamber 26, a choke 27 and a brake pipe passage 28, for reasons to be explained subsequently; said chokes being mounted in the bracket 5a. The passage 22 is constantly open to the control reservoir 6; and a branch of said passage is also constantly open to the usual control chamber 29 of the service valve device 7, so that pressures of fluid in the brake pipe 1 and in said chamber and control reservoir may equalize when the charging valve device 9 is in charging position. The passage 23 is constantly open to the brake pipe 1 by way of a choke 30 in the bracket 5a and the chamber 26, choke 27 and brake pipe passage 28. The chamber 24 is open to the auxiliary reservoir 3 by way of a passage 31 and the usual communication, including a chamber 32 encircling the service valve device 7, and the usual passage 33, choke 34, passage 35, brake cylinder limiting valve device (not shown) and passage 36.

It will be noted that the choke 27 is in series with the chokes 25, 30, the two latter chokes being in parallel with each other. The size of choke 25 in conjunction with that of choke 27 is such that charging of the control reservoir 6 will, during initial charging of the equipment, be accomplished by way of brake pipe passage 28 within a prescribed time; and the size of choke 30 in conjunction with that of choke 27 is such that charging of the auxiliary reservoir 3 will, during such initial charging, be likewise accomplished from passage 28 within the same time, since as previously noted, the volume of control reservoir 6 is substantially smaller than that of the auxiliary reservoir 3. It follows, therefore, that the combined flow capacity of the control reservoir charging chokes 27, 25 is less than that of the auxiliary reservoir charging chokes 27, 30, and hence that choke 25 is of smaller size than choke 30. The choke 27 is provided so that the chokes 25, 30 may be larger in size, as a precaution against clogging, than could otherwise be obtained by use of charging chokes 25, 30 along for the respective prescribed flow capacities. The flow capacity of choke 34 is large compared to that of the series connected chokes 27, 30 and hence does not effect a further reduction in the rate of charging of the auxiliary reservoir 3; said choke 34 being provided for controlling the rate of flow of fluid under pressure from said auxiliary reservoir to the brake cylinder device 4, as in the aforementioned application.

When the charging valve device 9 is in cut-off position, the combination stem and valve 16 is adapted to be so disposed as to close off communication of passages 21, 22 with each other by way of cavity 20, for thereby causing fluid under pressure to be bottled up in the passage 22, control reservoir 6 and control chamber 29 of service valve device 7, for reasons to be explained subsequently; and also in such cut-off position, the projecting end of said combination stem and valve is adapted to seal off passage 23 from chamber 24 so as to close off communication between the brake pipe 1 and auxiliary reservoir 3, for reasons also to be explained subsequently.

The control reservoir overcharge check valve device 10 comprises a valve 37, which may be disc-shaped, and seatable against a projecting, annular seat rib element 38 mounted in casing 5b. The valve 37 is subject at one side to pressure of fluid in a chamber 39, which is defined by the inner wall of the annular rib element 38 and constantly open to a branch of the passage 21; and subject at its opposite side to pressure of fluid in a chamber 40 which is constantly open to a passage 41 that is open through a choke 42 to the brake pipe passage 28.

During control reservoir overcharge dissipation, the flow capacity of choke 42 supplements that of the combined flow capacity of chokes 25, 27, so that such dissipation may be at a rate more rapid than that obtained during initial charging by the chokes 27, 25 alone, yet not so rapid as might prevent a brake application or prevent operation of the apparatus in the manner hereafter to be described.

The auxiliary reservoir overcharge check valve device 11 comprises a valve 43 which may be disc-shaped and seatable against a projecting annular seat rib element 44 mounted in casing 5b. The valve 43 is subject at one side to pressure of fluid in a chamber 45 defined by the inner wall of the annular rib element 44 and constantly open to a branch of the passage 23; and subject at its opposite side to pressure of fluid in a chamber 46 that is constantly open to a passage 47 which, in turn, is open through a choke 48 to the brake pipe passage 28.

During auxiliary reservoir overcharge dissipation, the flow capacity of choke 48 supplements that of the combined flow capacity of the series arranged chokes 30, 27, so that such dissipation may be at a rate more rapid than that obtained and permitted during initial charging by the chokes 27, 30 alone, yet not so rapid as might prevent a brake application or prevent operation of the apparatus in the manner hereafter to be described.

It is to be noted that the choke 48 is of smaller flow capacity than that of choke 42.

The improved brake apparatus also comprises the usual manually adjustable service selector valve device 49, a quick service valve device 50 and an inshot valve device 51, all of which may be identical with those shown and described in the aforementioned copending application.

The quick service valve device 50 comprises, briefly, a flexible diaphragm 57 which is operatively connected through the medium of a diaphragm follower to a rod 58 that has sealing, slidably guided engagement with the wall of a bore in the casing. The diaphragm 57 is subject at one side to pressure of fluid in a chamber 59 that is open to a branch of passage 35 and is subject at the opposite side to pressure of fluid in a chamber 60 that is be disconnected from the brake pipe passage 28 in consequence of the earlier deflection of the quick service valve diaphragm 57 to its normal position due to increased brake pipe pressure in chamber 60 and action of spring 61.

After the brakes fully release, there will be the usual short interval of time during which fluid pressure will blow down to atmosphere at a controlled rate from chamber 13 of charging valve device 9 by way of passage 18, the choke 99, passage 83, and cavity 93 of the service valve device 7; and during this same time interval brake pipe pressure and hence the pressure of fluid in passage 28 and the passages 21 and 23 will increase toward normal operating value. Hence, when the charging valve device 9 moves to charging position under action of spring 19 at the expiry of this time interval, brake pipe pressure in passage 21 will always be within several p. s. i. of control reservoir pressure and may even equal the latter pressure; whereas auxiliary reservoir pressure will be about one and seven-tenths p. s. i. below that of the bottled-up fluid in chamber 52 of the service valve device 7, or in other words, it may be as much as about four and seven-tenths p. s. i. below brake pipe pressure in passage 28, if the latter pressure is then up to normal operating value.

In this improved apparatus, when the charging valve device 9 moves to charging position, fluid under pressure will flow from the brake pipe passage 28 by way of previously described communication including passage 23 and chamber 24 to the auxiliary reservoir 3; and if, at such time, the pressure of fluid in brake pipe passage 28 and hence in passage 21 is less than that in the control reservoir 6, control reservoir pressure will equalize into the brake pipe 1 at a rate controlled by the combined effects of the series connected chokes 25, 27 and the control reservoir overcharge dissipation choke 42, but no depletion of control reservoir pressure into the auxiliary reservoir will occur due to the pressure head in the brake pipe 1 and hence in chamber 26 and the fact that the control reservoir 6 is isolated from the auxiliary reservoir 3 by way of chokes 25, 30. It is to be noted, however, that before any appreciable depletion of control reservoir pressure into the brake pipe occurs, the pressure of fluid in said brake pipe and hence in passage 28 will have built up to normal operating value, successively terminating further depletion and then, with overcharge check valve 37 closed, restoring control reservoir pressure by way of chokes 27, 25 and passage 21; whereas the auxiliary reservoir may not, at the time of such restoration of pressure, have been fully recharged due to the relatively large volume of the latter reservoir and the initially greater differential between auxiliary reservoir and brake pipe pressure.

It will now be noted that control reservoir pressure, if reduced at all, will not reduce appreciably following a brake release; and that even if frequent reapplications of the brakes are made while descending a long grade, the control reservoir pressure will never be materially depleted.

*Overcharge dissipation*

Assume now that the pressure of fluid in the control and auxiliary reservoirs exceeds that in the brake pipe, due for example to a changeover from a locomotive wherein the usual feed valve device had been set somewhat higher than that in the substituted locomotive, with the result that brake pipe pressure is reduced several p. s. i. when such changeover is completed; and that, in accordance with the usual practice, the handle of the aforementioned brake valve device on the substituted locomotive is in running position at the time the brake pipe on the locomotive is opened to that on the cars of the train.

Under such condition, with the brakes released on the cars, the charging valve device 9 will be in charging position. Since brake pipe pressure is now lower than heretofore, fluid under pressure will flow from the overcharged control reservoir 6 and control chamber 29 of service valve device 7 by way of passage 22 to passage 21, whence it will flow not only by way of chokes 25, 27 to brake pipe passage 28 but also by way of chamber 39 and past the unseated check valve 37 of the overcharge check valve device 10 to chamber 40 and thence via passage 41 and choke 42 to the brake pipe passage 28, for dissipating such overcharge to the brake pipe 1; the pressure in said brake pipe being then maintained at selected pressure by well-known operation of the brake valve device.

Similarly, fluid under pressure will flow from the overcharged auxiliary reservoir 3 by way of chamber 24 and passage 23 whence it will flow not only via chokes 30, 27 to the brake pipe passage 28 but also via chamber 45 and past the unseated check valve 43 of overcharge check valve device 11 to chamber 46 and thence via passage 47 and choke 48 to said brake pipe passage 28, for dissipating such overcharge to the brake pipe 1.

It should be noted that all of the chokes heretofore described, except the choke 99, are disposed in the pipe bracket 5a for thereby permitting easy access thereto and permitting convenient modification of choke sizes according to intended conditions of service.

*Summary*

It will now be seen that the improved fluid pressure brake apparatus embodies a novel arrangement for preventing depletion of control reservoir pressure into the auxiliary reservoir following the release of a brake application, with the result that the possibility of an appreciable reduction in control reservoir pressure is prevented even when the brakes are reapplied at frequent intervals, such as while descending a long grade.

It will also be seen that the dissipation of any excessive pressure in the control and auxiliary reservoirs is accomplished by separate overcharge check valve devices for each such reservoir.

Having now described the invention, what I claim as new and desire to secure by Letters Patent, is:

1. In a fluid pressure brake apparatus of the type comprising a valve device responsive to a reduction in pressure of fluid in a brake pipe relative to that in a control reservoir for supplying fluid under pressure from an auxiliary reservoir to a brake controlling communication for effecting an application of brakes and responsive to restoration of brake pipe pressure toward equality with control reservoir pressure for effecting a release of brakes, the combination of a first passage constantly open to said brake pipe, a second passage constantly open to said brake pipe, charging valve means responsive to release of fluid under pressure from a chamber to open said first passage to said auxiliary reservoir and also open said second passage to said control reservoir and operative upon supply of fluid under pressure to said chamber to close off said first passage and second passage from said auxiliary reservoir and control reservoir, respectively, first choke means interposed in said first passage for controlling, at one rate, flow of fluid under pressure from said brake pipe to said auxiliary reservoir, second choke means interposed in said second passage for controlling flow of fluid under pressure between said brake pipe and control reservoir at another rate, a passageway through which fluid under pressure may be conveyed to and released from said chamber, another valve device responsive to a reduction in brake pipe pressure for supplying fluid under pressure to said chamber via said passageway, and third choke means interposed between said chamber and said brake controlling communication for restricting flow of fluid under pressure therebetween.

2. In a fluid pressure brake apparatus, in combination, a brake pipe, a control reservoir, an auxiliary reservoir, a brake controlling communication to which fluid under pressure is supplied for effecting an application of brakes and from which fluid under pressure is released for effecting a release of brakes, a first communication through which fluid under pressure may flow from said brake pipe to said auxiliary reservoir, a second communication through which fluid under pressure may flow from said brake pipe to said control reservoir, first choke means in said first communication for restricting the rate of fluid flow therethrough at one rate, second choke means for restricting the rate of fluid flow therethrough at another rate, charging valve means having a chamber and operative when said chamber is charged with fluid under pressure to interrupt fluid flow through said first and second communications and operative when said chamber is substantially vented to permit fluid flow through said first and second communications, a quick service volume, a valve device for supplying fluid under pressure from said brake pipe to said volume following a reduction in brake pipe pressure and for terminating such supply upon a restoration of brake pipe pressure, another valve device for closing said volume to said chamber until pressure in said brake controlling communication is reduced below a selected value and then opening said volume to said chamber, and third choke means interposed between said chamber and brake controlling communication for restricting the rate of blowdown of fluid under pressure from said chamber to the latter communication for thereby deferring operation of said charging valve means to reopen said first and second communications.

3. In a fluid pressure brake apparatus of the type comprising a valve device responsive to a reduction in pressure of fluid in a brake pipe relative to that in a control reservoir for supplying fluid under pressure from an auxiliary reservoir to a brake controlling communication for effecting an application of brakes and responsive to restoration of brake pipe pressure toward equality with control reservoir pressure for effecting a release of brakes, the combination of a first passage open to said brake pipe, a second passage open to said brake pipe, charging valve means responsive to release of fluid under pressure from a chamber to assume a charging position in which said first passage is open to said auxiliary reservoir and said second passage is open to said control reservoir and operative upon supply of fluid under pressure to said chamber to assume a cut-off position in which said first passage and second passage are closed to said auxiliary reservoir and control reservoir, respectively, first choke means interposed between said brake pipe and first passage for controlling at one rate, flow of fluid under pressure from said brake pipe to said auxiliary reservoir, second choke means interposed between said brake pipe and second passage for controlling, at another rate, flow of fluid under pressure from said brake pipe to said control reservoir, a first restricted communication open to said brake pipe, auxiliary reservoir overchage check valve means subject opposingly to fluid pressures in said first restricted communication and said first passage for permitting flow of fluid under pressure only from the latter to the former by way of a branch of said first passage when, with said charging valve means in its said charging position, fluid pressure in said auxiliary reservoir exceeds that in said brake pipe and whereby such excessive auxiliary reservoir pressure is dissipated at a rate corresponding to the combined flow capacities of said first restricted communication and said first choke means, a second restricted communication open to said brake pipe, and control reservoir overcharge check valve means subject opposingly to fluid pressures in said second restricted communication and in said second passage for permitting flow of fluid under pressure only from the latter to the former by way of a branch of said second passage when, with said charging valve means in its said charging position, fluid pressure in said control reservoir exceeds that in said brake pipe and whereby such excessive control reservoir pressure is released at a rate corresponding to the combined flow capacities of said second restricted communication and said second choke means.

4. In a fluid pressure brake apparatus of the type comprising a service valve device responsive to a reduction in pressure of fluid in a brake pipe relative to a datum pressure in a control reservoir to supply fluid under pressure from an auxiliary reservoir via a brake controlling communication to a brake applying means for effecting an application of brakes, the combination of a pipe bracket to which are connected said brake pipe, brake applying means, control reservoir, and auxiliary reservoir, a casing on which said pipe bracket is mounted, a charging valve device in part defined by said casing and comprising a movable abutment subject opposingly to pressure of fluid in a control chamber and action of a bias spring and further comprising valve means carried by said movable abutment, a first passage in said casing and open to said brake pipe, first choke means mounted in said pipe bracket for restricting flow of fluid under pressure through said first passage, a second passage in said casing and open to said brake pipe, second choke means mounted in said pipe bracket for restricting flow of fluid under pressure through said second passage, an auxiliary reservoir charging communication in part formed in said casing and pipe bracket, a control reservoir charging communication in part formed in said casing and pipe bracket, said charging valve device being operative to assume one position when said control chamber is vented for causing said valve means to open said first passage to said auxiliary reservoir charging communication and concurrently open said second passage to said control reservoir charging communication and responsive to pressure of fluid in said control chamber to assume another position for causing said valve means to close said first and second passages to said auxiliary reservoir charging communication and control reservoir charging communication, respectively.

References Cited in the file of this patent

UNITED STATES PATENTS

| 1,936,966 | Kasantzeff | Nov. 28, 1933 |
| 2,661,248 | Keller | Dec. 1, 1953 |

FOREIGN PATENTS

| 668,122 | Great Britain | Mar. 12, 1952 |